United States Patent
Henry

(10) Patent No.: US 11,734,905 B1
(45) Date of Patent: *Aug. 22, 2023

(54) SYSTEMS AND METHODS FOR LIGHTING SUBJECTS FOR ARTIFICIAL REALITY SCENES

(71) Applicant: Meta Platforms Technologies, Inc., Menlo Park, CA (US)

(72) Inventor: Colleen Kelly Henry, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,958

(22) Filed: Oct. 4, 2022

Related U.S. Application Data

(63) Continuation of application No. 17/347,688, filed on Jun. 15, 2021, now Pat. No. 11,495,004.

(51) Int. Cl.
| | | |
|---|---|---|
| *G06T 19/20* | (2011.01) | |
| *G06T 19/00* | (2011.01) | |
| *G06T 15/50* | (2011.01) | |
| *H04N 23/72* | (2023.01) | |

(52) U.S. Cl.
CPC ............ *G06T 19/20* (2013.01); *G06T 15/503* (2013.01); *G06T 19/006* (2013.01); *H04N 23/72* (2023.01)

(58) Field of Classification Search
None
See application file for complete search history.

(56) References Cited

U.S. PATENT DOCUMENTS

| | | | |
|---|---|---|---|
| 4,290,683 | A | 9/1981 | Bagdis |
| 5,208,675 | A | 5/1993 | Wilson et al. |
| 8,884,984 | B2 | 11/2014 | Flaks et al. |
| 9,573,062 | B1 | 2/2017 | Long et al. |
| 9,766,463 | B2 | 9/2017 | Border et al. |
| 2002/0186314 | A1 | 12/2002 | Debevec |

(Continued)

FOREIGN PATENT DOCUMENTS

| | | |
|---|---|---|
| EP | 0954169 A2 | 11/1999 |
| WO | 2020079201 A1 | 4/2020 |

OTHER PUBLICATIONS

International Search Report and Written Opinion for International Application No. PCT/US2022/030319, dated Sep. 13, 2022, 15 pages.

(Continued)

*Primary Examiner* — Robert J Craddock
(74) *Attorney, Agent, or Firm* — Greenberg Traurig, LLP

(57) ABSTRACT

A computer-implemented method for lighting subjects for artificial reality scenes may include (i) identifying (a) a physical camera configured to capture a physical subject for insertion into an artificial reality scene, (b) a physical light source that is positioned such that the physical light source lights the physical subject recorded by the physical camera, and (c) lighting conditions in the artificial reality scene, (ii) determining at least one lighting parameter to light the physical subject such that lighting conditions of the physical subject blend visually with the lighting conditions in the artificial reality scene, and (iii) configuring the physical light source to light the physical subject according to the at least one lighting parameter. Various other methods, systems, and computer-readable media are also disclosed.

20 Claims, 8 Drawing Sheets

(56) References Cited

U.S. PATENT DOCUMENTS

| | | |
|---|---|---|
| 2004/0027820 A1 | 2/2004 | Hilmersen |
| 2004/0239761 A1 | 12/2004 | Jin et al. |
| 2005/0174473 A1 | 8/2005 | Morgan et al. |
| 2010/0313146 A1 | 12/2010 | Nielsen et al. |
| 2014/0334745 A1 | 11/2014 | Fleischer et al. |
| 2015/0091941 A1 | 4/2015 | Das et al. |
| 2018/0097972 A1 | 4/2018 | Bourret |
| 2018/0125586 A1 | 5/2018 | Sela et al. |
| 2019/0176027 A1 | 6/2019 | Smith et al. |

OTHER PUBLICATIONS

Prakash S., et al., "GLEAM: An Illumination Estimation Framework for Real-time Photorealistic Augmented Reality on Mobile Devices," In Proceedings of the 17th Annual International Conference on Mobile Systems, Applications, and Services, Jun. 2019, pp. 142-154.

Richter-Trummer T., et al., "Instant Mixed Reality Lighting from Casual Scanning," IEEE International Symposium on Mixed and Augmented Reality, Dec. 2016, pp. 27-36.

Wang Y., et al., "Estimation of Multiple Directional Light Sources for Synthesis of Augmented Reality Images," Graphical Models, 2003, vol. 65, No. 4, pp. 185-205.

SYSTEMS AND METHODS FOR LIGHTING SUBJECTS FOR ARTIFICIAL REALITY SCENES

INCORPORATION BY REFERENCE AND CROSS REFERENCE TO RELATED APPLICATION

This application is a continuation of U.S. application Ser. No. 17/347,688, filed 15 Jun. 2021, the disclosure of which is incorporated by its entirety by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1B:
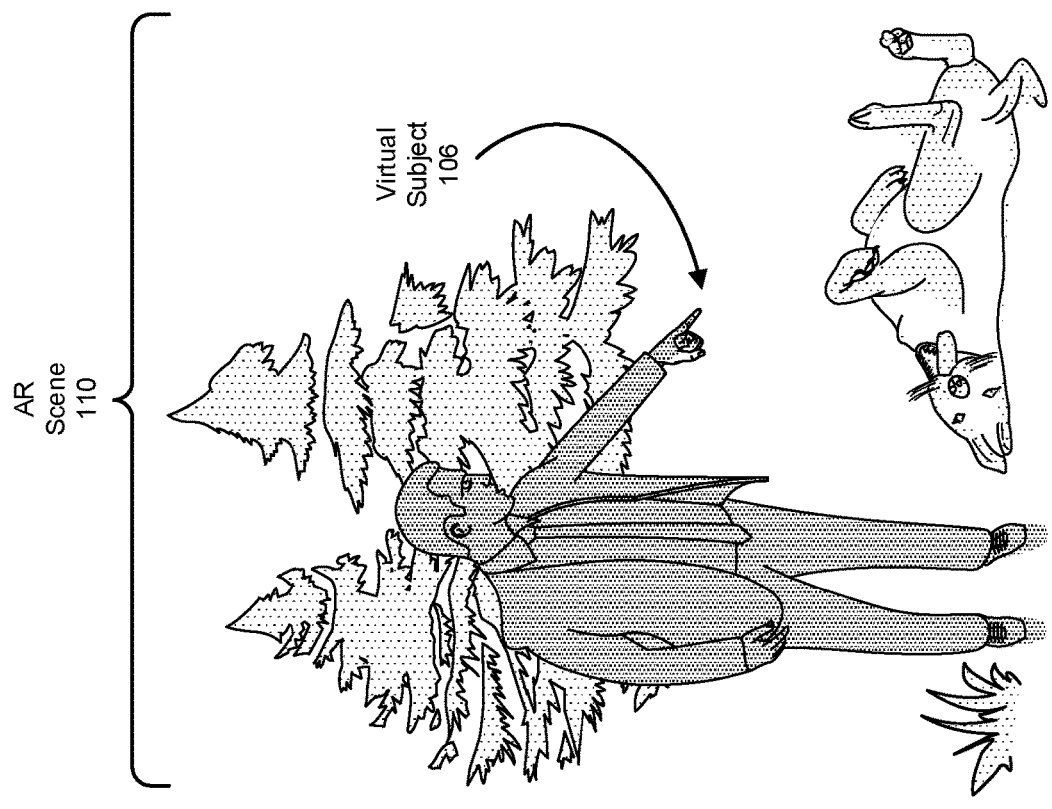
FIGS. 1A and 1B are illustrations of an exemplary subject in lighting conditions that do not blend visually with the lighting conditions of an artificial reality scene.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

Digitally inserting a real person being captured by a physical camera into a computer-generated virtual scene (e.g., an artificial reality scene) may look unrealistic or strange if the lighting on the person does not blend visually with the lighting in the scene. The disclosed systems and methods may improve this situation by lighting the physical scene (e.g., using lights that are integrated into or attached to a camera assembly) to match or more closely correspond to the lighting in the artificial reality scene. In some embodiments, the systems described herein may use a single light source attached to a camera assembly. Additionally or alternatively, the systems described herein may use multiple camera assemblies at different angles, each with and acting as a light source. In some embodiments, the light sources and the cameras may be decoupled. In some examples, the systems described herein may track the movement of the subject's avatar through the virtual scene and update the light being output by the light source(s) accordingly.

In some embodiments, the systems described herein may improve the functioning of a computing device by improving the ability of the computing device to generate realistic and/or immersive artificial reality content. In one embodiment, the systems described herein may improve the function of a computing device by conserving resources (e.g., processing, memory, etc.) that would be otherwise used to digitally correct lighting. In some embodiments, the systems described herein may improve the functioning of a light source by enabling the light source to be configured based on the lighting conditions in an artificial reality scene. In one embodiment, the systems described herein may improve the functioning of a camera by improving the ability of the camera to capture a subject in appropriate lighting conditions. Additionally, the systems described herein may improve the field of artificial reality by enabling artificial reality systems to generate more realistic and/or immersive content for consumption by a creator of the content and/or viewers of the content.

Systems and methods for improving lighting in artificial reality scenes may be implemented in conjunction with various different types of artificial reality. The term "artificial reality (AR)" generally describes a form of reality that has been adjusted in some manner before presentation to a user, which may include, for example, a virtual reality, an augmented reality, a mixed reality, a hybrid reality, or some combination and/or derivative thereof. AR content may include completely computer-generated content or computer-generated content combined with captured (e.g., real-world) content. The AR content may include video, audio, haptic feedback, or some combination thereof, any of which may be presented in a single channel or in multiple channels (such as stereo video that produces a three-dimensional (3D) effect to the viewer). Additionally, in some embodiments, AR may also be associated with applications, products, accessories, services, or some combination thereof, that are used to, for example, create content in an AR and/or are otherwise used in (e.g., to perform activities in) an AR. In some embodiments, AR content may be presented in non-AR-specific channels, such as rectilinear display (e.g., on the screen of a personal computing device or mobile phone). The term "artificial reality scene" may generally refer to any scene or setting in an AR environment.

Figure 1A:
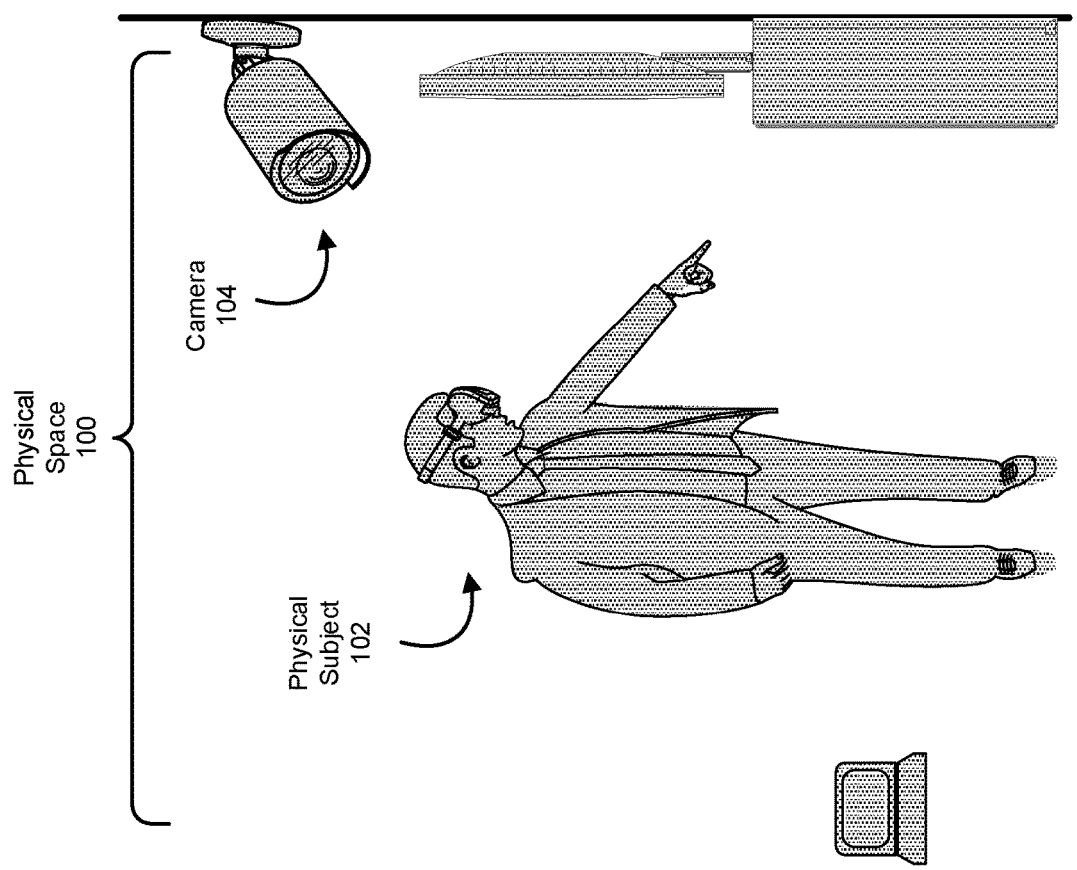

In some examples, an AR system may insert a subject (e.g., a user) into an AR scene that has different lighting conditions than the physical space occupied by the subject. For example, as illustrated in FIG. 1A, a camera 104 in a physical space 100 may capture a physical subject 102 for insertion into an AR scene 110. The term "physical subject" may generally refer to the physical body of a person in a physical environment, as opposed to a three-dimensional model of the person in a virtual environment. In one embodiment, as shown in FIG. 1B, a virtual subject 106 may be a three-dimensional avatar of physical subject 102 that the systems described herein insert into AR scene 110. In some examples, lighting conditions in AR scene 110 may not match lighting conditions in physical space 100, leading to virtual subject 106 appearing jarringly out-of-place in AR scene 110. For example, physical space 100 may be dimly lit with yellow light while AR scene 110 may be brightly lit with cold white light, leading to virtual subject 106 appearing darker and yellower than the surrounding scene. This discrepancy may reduce immersion for the user within AR scene 110 and/or for viewers viewing AR scene 110 (e.g., through AR devices such as headsets and/or through non-AR devices such as laptops or mobile phones).

The term "lighting conditions" may generally refer to any characteristics of light within a scene, on a subject, and/or captured by a physical or virtual camera. Lighting conditions may include the color, directionality, and/or intensity of light from one or more physical or virtual light sources. For example, a scene that is brightly lit with warm white light from a single light source may have different lighting conditions than a scene that is dimly lit from two light sources, one red and the other blue. In some embodiments, lighting conditions may include the presence, depth, and/or direction of shadows. For example, a moderately lit scene with long blue-tinted shadows to the left of objects may have different lighting conditions from a moderately lit scene with short green-tinted shadows to the right of objects. In some examples, lighting conditions may include how lighting in a scene changes over time (e.g., in intensity, color, directionality and/or any other relevant aspect). In some embodiments, lighting conditions may include light with different characteristics in different parts of a scene, such as different foreground and background lighting characteristics.

Figure 2B:
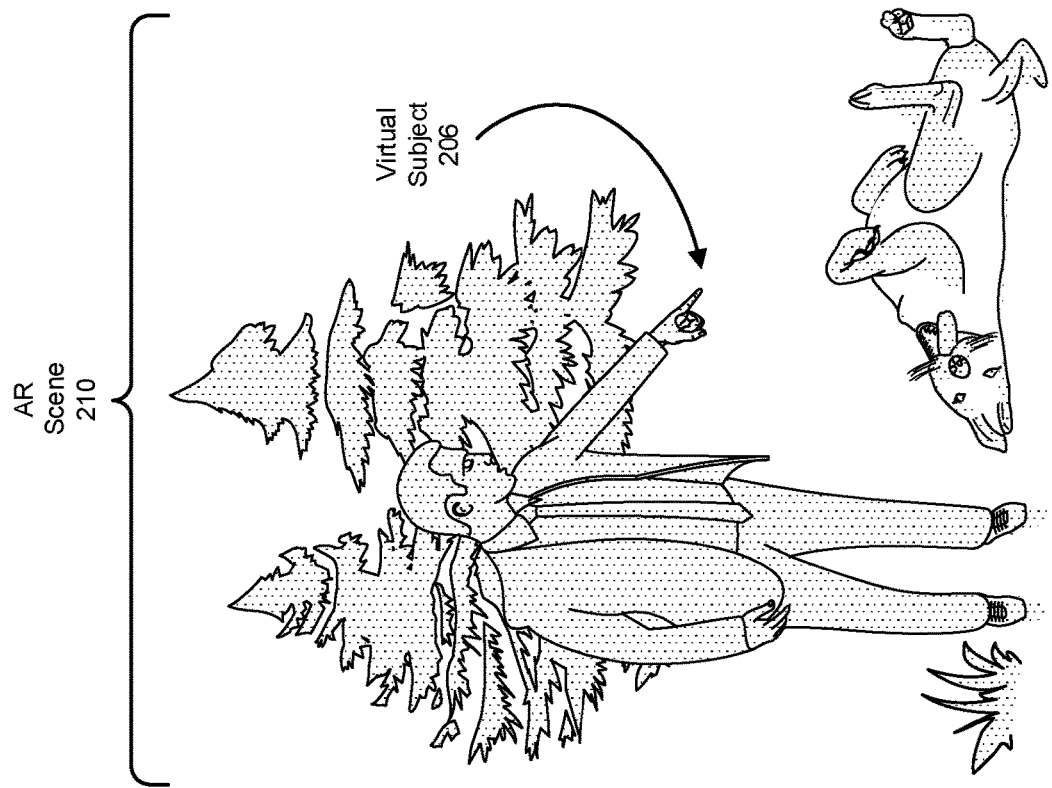
FIGS. 2A and 2B are illustrations of an exemplary system that creates lighting conditions for a subject that do blend visually with the lighting conditions of an artificial reality scene.
Figure 2A:
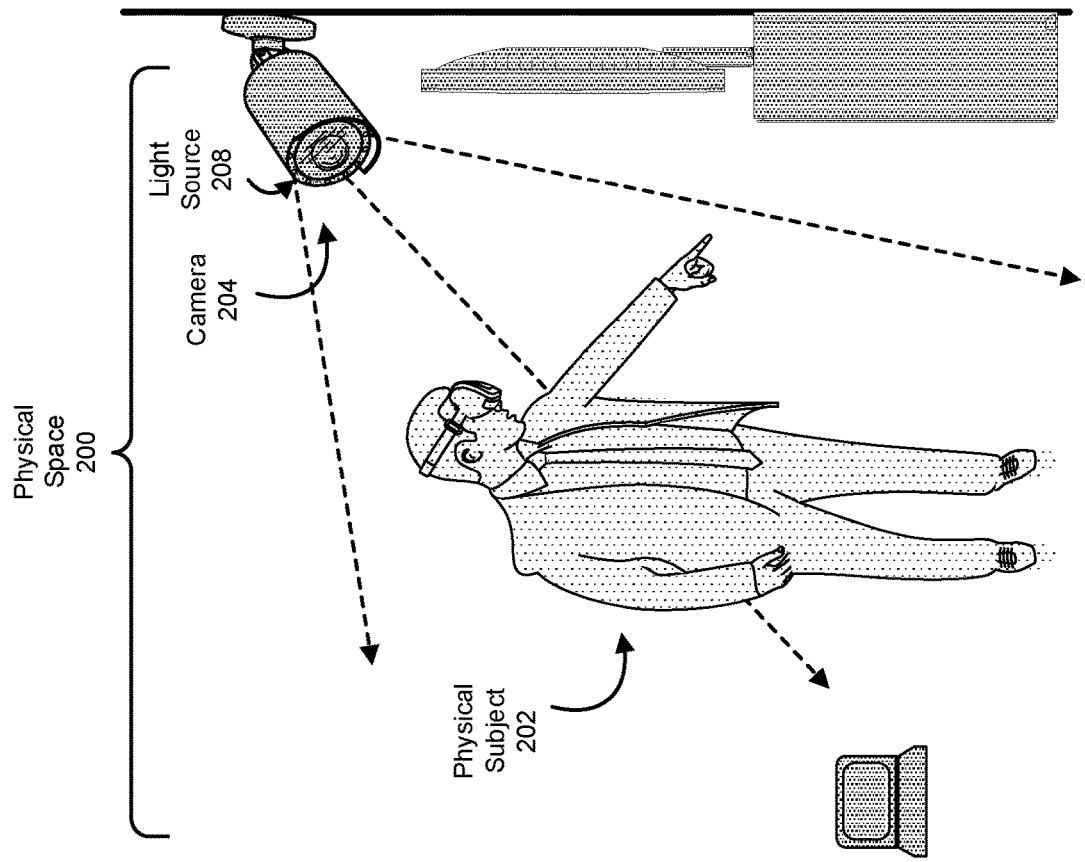

In some embodiments, the systems described herein may light a subject to blend visually with lighting conditions in an AR scene, improving immersion and quality. The phrase "blend visually with lighting conditions" may refer to any increase in correspondence between two sets of lighting conditions, whether the outcome is identical matching or a more close but non-identical correspondence. In one example, enabling a subject to blend visually with lighting conditions may include compositing the subject and the lightning conditions. For example, as illustrated in FIGS. 2A and 2B, a camera 204 in a physical space 200 capturing a physical subject 202 for insertion into an AR scene 210 may be equipped with a light source 208 that lights physical subject 202 to blend visually with the lighting conditions in AR scene 210. In this example, a virtual subject 206 may blend visually with the lighting conditions in AR scene 210 due to the light provided by light source 208 lighting physical subject 202 appropriately. In one example, AR scene 210 may be brightly lit with cold white light from a single source (e.g., a virtual sun) and light source 208 may light physical subject 202 with cold white light, enabling virtual subject 206 to blend visually with the rest of AR scene 210.

Figure 3:
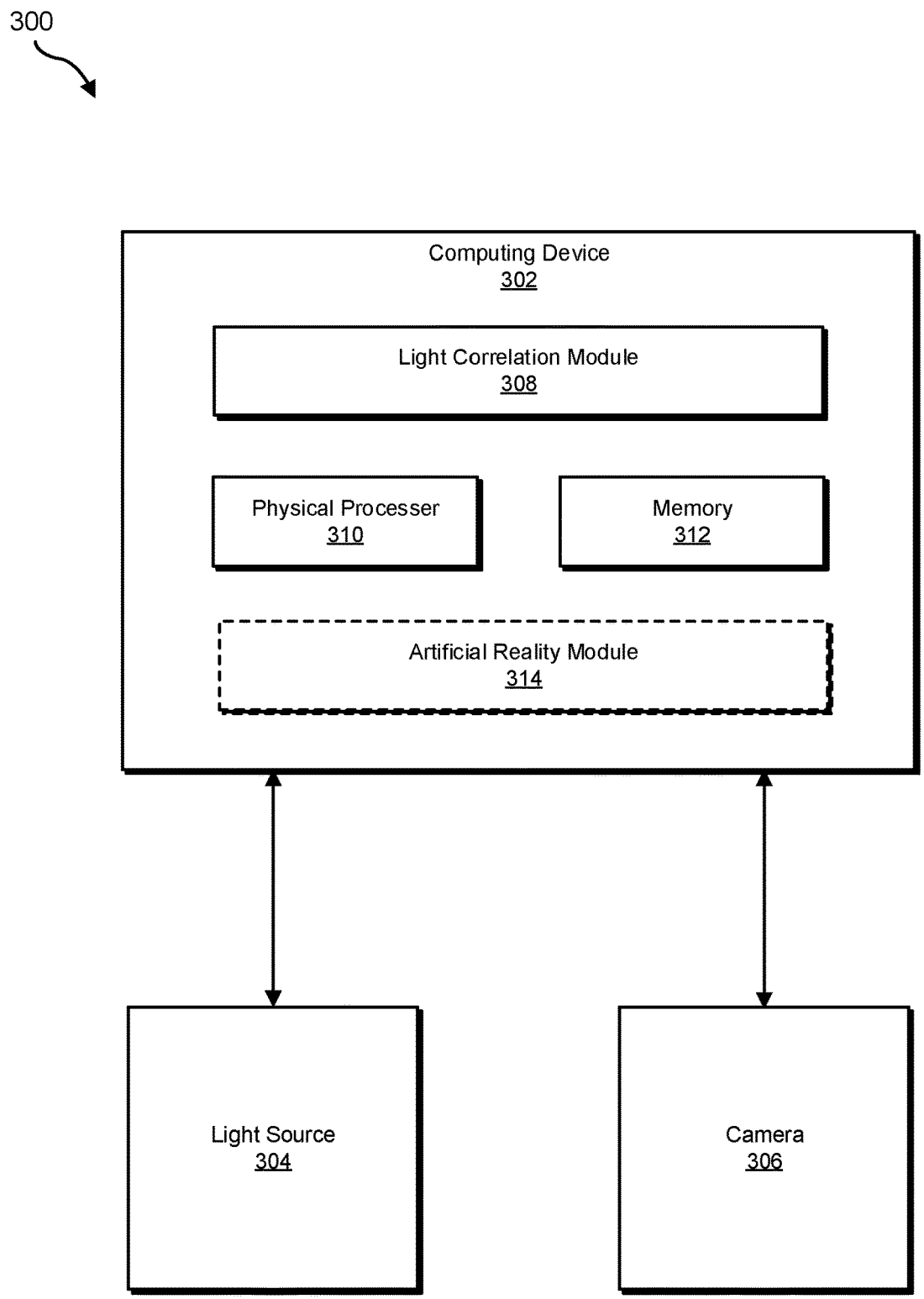
FIG. 3 is a block diagram of an exemplary system for lighting subjects for artificial reality scenes.

In some embodiments, the systems described herein may be implemented on a computing device. FIG. 3 is a block diagram of an exemplary system 300 for lighting subjects for artificial reality scenes. In one embodiment, and as will be described in greater detail below, a computing device 302 may be configured with a light correlation module 308 that configures a light source 304 to light a subject being captured by a camera 306 to blend visually with lighting conditions in an AR scene. In some embodiments, computing device 302 may include an AR module 312 that inserts a three-dimensional avatar of the subject captured by camera 306 into the AR scene. In other embodiments, AR module 312 may be hosted on a separate computing device.

Computing device 302 generally represents any type or form of computing device capable of reading computer-executable instructions. For example, computing device 302 may represent a multipurpose endpoint computing device, such as a laptop or desktop. In other examples, computing device 302 may represent an AR device, such as a headset or controller. Additional examples of computing device 302 may include, without limitation, a server, a wearable device, a gaming system, a smart device, a personal digital assistant (PDA), etc.

Light source 304 generally represents any type or form of physical device configured to produce light to light areas and/or objects (as opposed to, e.g., a status light that indicates a device is operating but does not light objects). In some embodiments, light source 304 may have a single light-emitting element, such as a bulb or light-emitting diode (LED). In other embodiments, light source 304 may consist of multiple light-emitting elements working in conjunction. In some embodiments, light source 304 may be an integral, non-removable part of the housing of a physical camera. For example, light source 304 may include a number of LEDs placed around the lens of a camera. Additionally or alternatively, light source 304 may be designed to be removably affixed to a camera. For example, light source 304 may include a housing for a light-emitting element that can be temporarily coupled to a camera. In some embodiments, light source 304 may be entirely independent of a camera. For example, light source 304 may be a lamp or an LED strip. In some embodiments, light source 304 may be configured to receive instructions (e.g., lighting parameters) via a network (e.g., a local area network and/or a wireless network) and/or via near-field communication. In some examples, light source 304 may be a pre-existing light in the physical space and/or other type of lighting source that is not specifically designed to light scenes for video capture. For example, light source 304 may be a smart light installed in the room.

Camera 306 generally represents any type or form of device that is capable of capturing images and/or video of a subject. In some embodiments, camera 306 may be an integrated part of a computing device, such as a laptop webcam, an AR motion tracker, or a smartphone camera. In other embodiments, camera 306 may be a specialized camera device that is not part of a general-purpose computing device. In some examples, camera 306 may record images and/or video of a subject for later editing and/or viewing. Additionally or alternatively, camera 306 may capture live video of a subject for real-time streaming. In some embodiments, camera 306 may transmit video via a network and/or via near-field communication. Similarly, the term "physical camera" may generally refer to any of the aforementioned embodiments and/or examples.

In some embodiments, exemplary system 300 may also include one or more memory devices, such as memory 340. Memory 340 generally represents any type or form of volatile or non-volatile storage device or medium capable of storing data and/or computer-readable instructions. In one example, memory 340 may store, load, and/or maintain one or more modules (e.g., light correlation module 308 and/or AR module 314). Examples of memory 340 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 3, example system 300 may also include one or more physical processors, such as physical processor 330. Physical processor 330 generally represents any type or form of hardware-implemented processing unit capable of interpreting and/or executing computer-readable instructions. In one example, physical processor 330 may access and/or modify one or more modules stored in memory 340. Additionally or alternatively, physical processor 330 may execute one or more modules. Examples of physical processor 330 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 4:
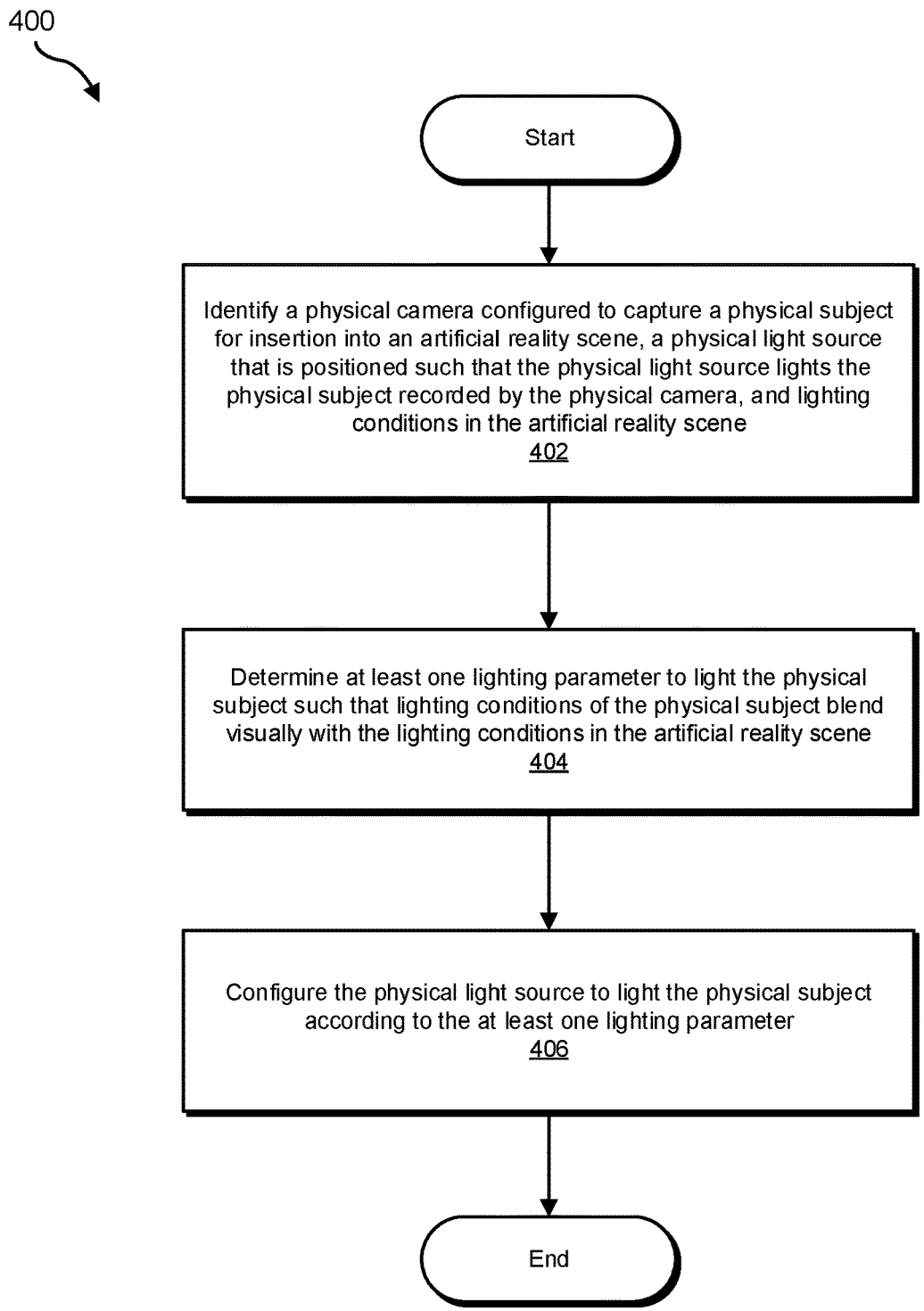
FIG. 4 is a flow diagram of an exemplary method for lighting subjects for artificial reality scenes.

FIG. 4 is a flow diagram of an exemplary method 400 for lighting subjects for AR scenes. In some examples, at step 402, the systems described herein may identify (i) a physical camera configured to capture a physical subject for insertion into an AR scene, (ii) a physical light source that is positioned such that the physical light source lights the physical subject recorded by the physical camera, and (iii) lighting conditions in the AR scene. For example, the systems described herein may identify a physical camera that is an integrated part of an AR system. Additionally or alternatively, the systems described herein may identify a general-purpose (i.e., non-AR-specific) physical camera that a user has configured to capture images and/or video for insertion into AR scenes. In some examples, the systems described herein may identify a physical light source by determining that the physical light source is connected (e.g., via a wired or wireless connection) to a computing device. In one embodiment, the systems described herein may identify the lighting conditions in the AR scene by receiving, intercepting, and/or analyzing information from an AR system. For example, the systems described herein may query a module that configures lighting for the AR scene to determine the lighting parameters of the current AR scene.

At step 404, the systems and methods described herein may determine at least one lighting parameter to light the physical subject such that lighting conditions of the physical subject blend visually with the lighting conditions in the artificial reality scene. The systems described herein may determine the lighting parameter or parameters in a variety of ways.

The term "lighting parameter" may generally refer to any description of light that is interpretable by a lighting source. In some examples, a lighting parameter may describe the color, intensity, polarity, and/or location of light. For example, a lighting parameter may include a hexadecimal, RGB, and/or CMYK encoding of a color of light. In one example, a lighting parameter may include instructions for the percentage intensity at which to set an LED. In some examples, a lighting parameter may instruct a lighting source about which of multiple light bulbs to activate. Lighting parameters may include descriptions of light outside of the human visual spectrum, such as ultraviolet and/or infrared.

In some embodiments, the systems described herein may determine the lighting parameter based on a combination of the lighting in the AR scene and the lighting in the physical space occupied by the subject. For example, if the AR scene is dimly lit with magenta light and the physical space is dimly lit with red light, the systems described herein may determine that lighting parameters that specify dim blue light in order to bridge the gap between the lighting in the AR scene and the lighting in the physical space. In another example, if the AR scene is brightly lit and the physical space is moderately lit, the systems described herein determine lighting parameters that specify a moderate intensity of light. In some examples, the systems described herein may calibrate the lighting parameters based at least in part on the outcome of applying the lighting parameters. For example, the systems described herein may determine lighting parameters that specify moderate intensity cyan light and may then determine that the physical space is more brightly lit and more cyan than the AR scene. In this example, the systems described herein may recalibrate the lighting parameters to be less intense and/or less cyan. In some embodiments, the systems described herein may continue this feedback loop for multiple iterations. In one embodiment, the systems described herein may recalibrate lighting parameters in response to predetermined triggers, such as when a new lighting source is added and/or when the systems described herein detect a change in ambient lighting conditions (e.g., more light coming in through a window as the weather outside becomes sunnier).

In some examples, the systems described herein may determine separate instances of a lighting parameter and/or multiple sets of lighting parameters that affect which of several physical lights will produce light of what intensity. For example, if the physical space includes multiple light sources and the AR scene is lit by a single light source, the systems described herein may determine lighting parameters that specify that only a single physical light source produce light or that a single physical light source produce intense light and additional light sources produce dim light. In another example, if the AR scene is lit by multiple light sources, the systems described herein may determine lighting parameters that specify intense light from the physical light sources with the positions that most closely match those of the virtual light sources relative to the subject and no light or dim light from any other physical light sources. In some embodiments, one or more light sources may be mounted on a movable assembly (e.g., a track, a swivel, etc.) and the systems described herein may automatically reposition light sources to light the subject in accordance with the lighting in the virtual scene.

At step 406, the systems and methods described herein may configure the physical light source to light the physical subject according to the at least one lighting parameter. For example, the systems described herein may transmit the lighting parameters to the light source or light sources. In some embodiments, the systems described herein may transmit the lighting parameters via a wired and/or wireless connection.

In one embodiment, the systems described herein may insert a three-dimensional model of the subject (e.g., an avatar) into the AR scene. Additionally or alternatively, the systems described herein may interface with an AR system that inserts an avatar of the subject into the AR scene. In some embodiments, the avatar may be constructed based at least in part on video of the subject captured by one or more physical cameras. In some examples, the systems described herein may adapt the avatar. For example, if the physical subject is wearing an AR headset, the systems described herein may not display the AR headset on the subject's avatar. In one embodiment, the systems described herein may replace the AR headset with a computer-generated model that occludes a similar area on the subject's face as the headset, such as a helmet, mask, and/or goggles.

In some embodiments, the systems described herein may stream video of the avatar in the AR scene to one or more endpoint devices operated by users who are not the subject. In one embodiment, the systems described herein may stream the video to server that then streams the video to the endpoint devices. In one example, the subject may be playing an AR game about alligator wrestling while streaming their game experience to viewers. In this example, viewers may watch the avatar of the subject wrestle virtual alligators within the AR scene. In some examples, a viewer may watch the experience via an AR device, such as a headset, that allows the viewer to be immersed in the AR scene and to view the avatar wrestling the alligator from any angle. Additionally or alternatively, a viewer may watch the virtual alligator wrestling stream on a general-purpose computing device without specialized AR features, such as a laptop or mobile phone. Viewers using a non-AR device may be limited to a single virtual camera angle or may be able to switch between virtual cameras. In some embodiments, the systems described herein may use multiple physical cameras and/or sensors (e.g., time-of-flight, light detection and ranging, etc.) to measure depth in the physical space and place a virtual camera in the game engine to match the perspective of a physical camera. Regardless of the endpoint viewing device and/or viewpoint, the systems described herein may enhance viewers' viewing experience by lighting the physical subject to blend visually with the lighting conditions in the AR scene, enabling the avatar look natural next to the alligator rather than appearing out-of-place due to different lighting.

Figure 5:
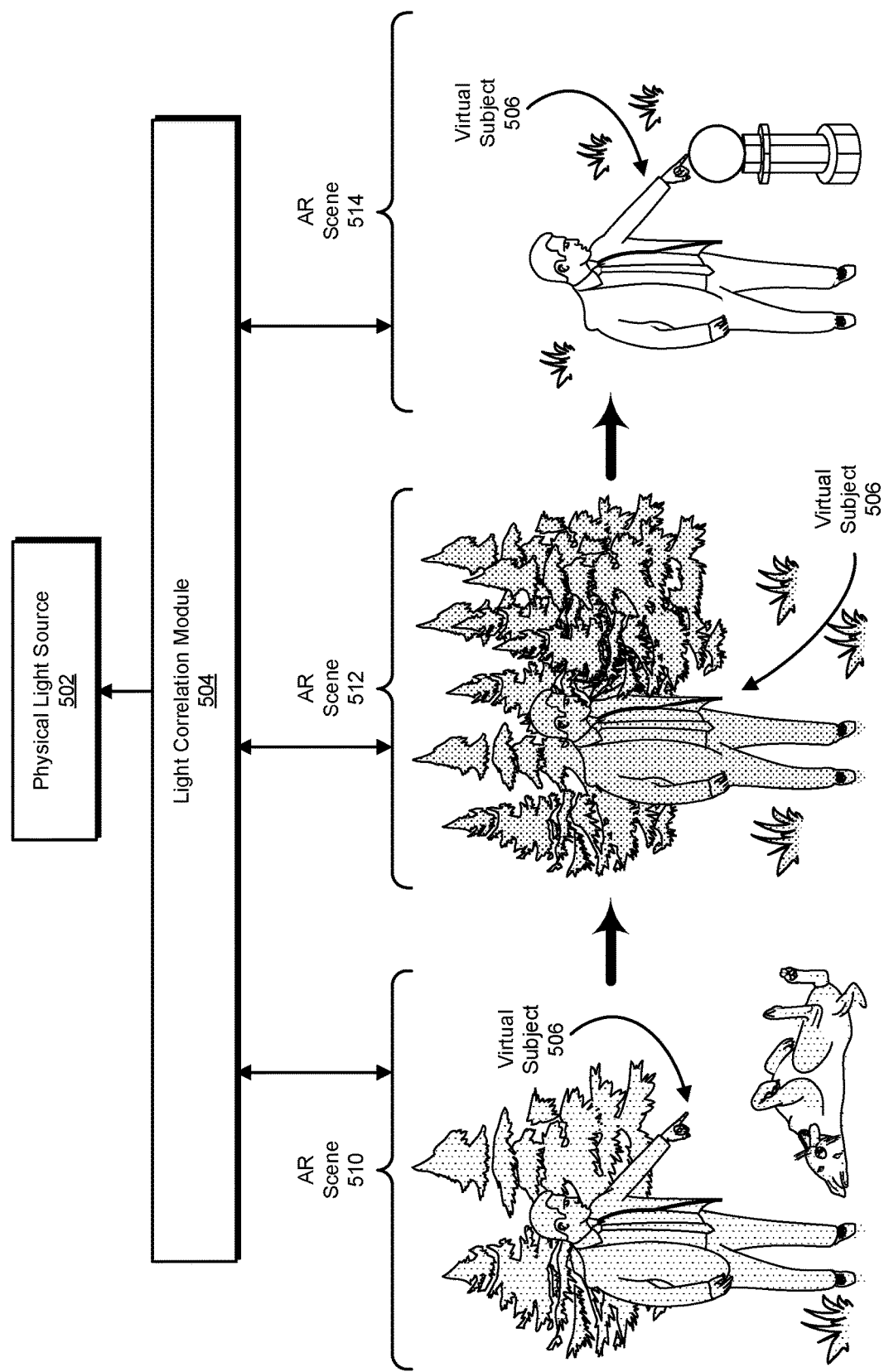
FIG. 5 is an illustration of an exemplary an exemplary system that creates lighting conditions for a subject that change based on the lighting conditions of multiple artificial reality scenes.

In some embodiments, the systems described herein may detect that the lighting conditions of the AR scene are changing to new lighting conditions, determine new lighting parameter(s), and reconfigure the physical light source(s) with the new lighting parameter(s). For example, as illustrated in FIG. 5, a light correlation module 504 may monitor the lighting conditions of an AR scene 510. In one example, light correlation module 504 may configure a physical light source 502 to light a physical subject such that virtual subject 506 blends visually with the lighting of the rest of AR scene 510. At some point in time, virtual subject 506 may move into AR scene 512 that has different lighting conditions from AR scene 510. For example, a player of an AR game may explore the environment and move from a moderately-lit clearing to a dimly-lit forest. In some embodiments, light correlation module 504 may detect the change in lighting conditions (e.g., by monitoring and/or receiving information form a module that configures the lights for the AR scenes) and may determine new lighting parameters that will enable physical light source 502 to light a physical subject such that virtual subject 506 blend visually with the lighting conditions in AR scene 512. Later, virtual subject 506 may move to yet another scene, such as AR scene 514, that has different lighting conditions from AR scene 512. For example, AR scene 512 may be dimly lit with green light while AR scene 514 may be brightly lit with warm white light. Light correlation module 504 may update the lighting parameters again to account for the change in lighting conditions and may configure physical light source 502 accordingly.

Figure 6:
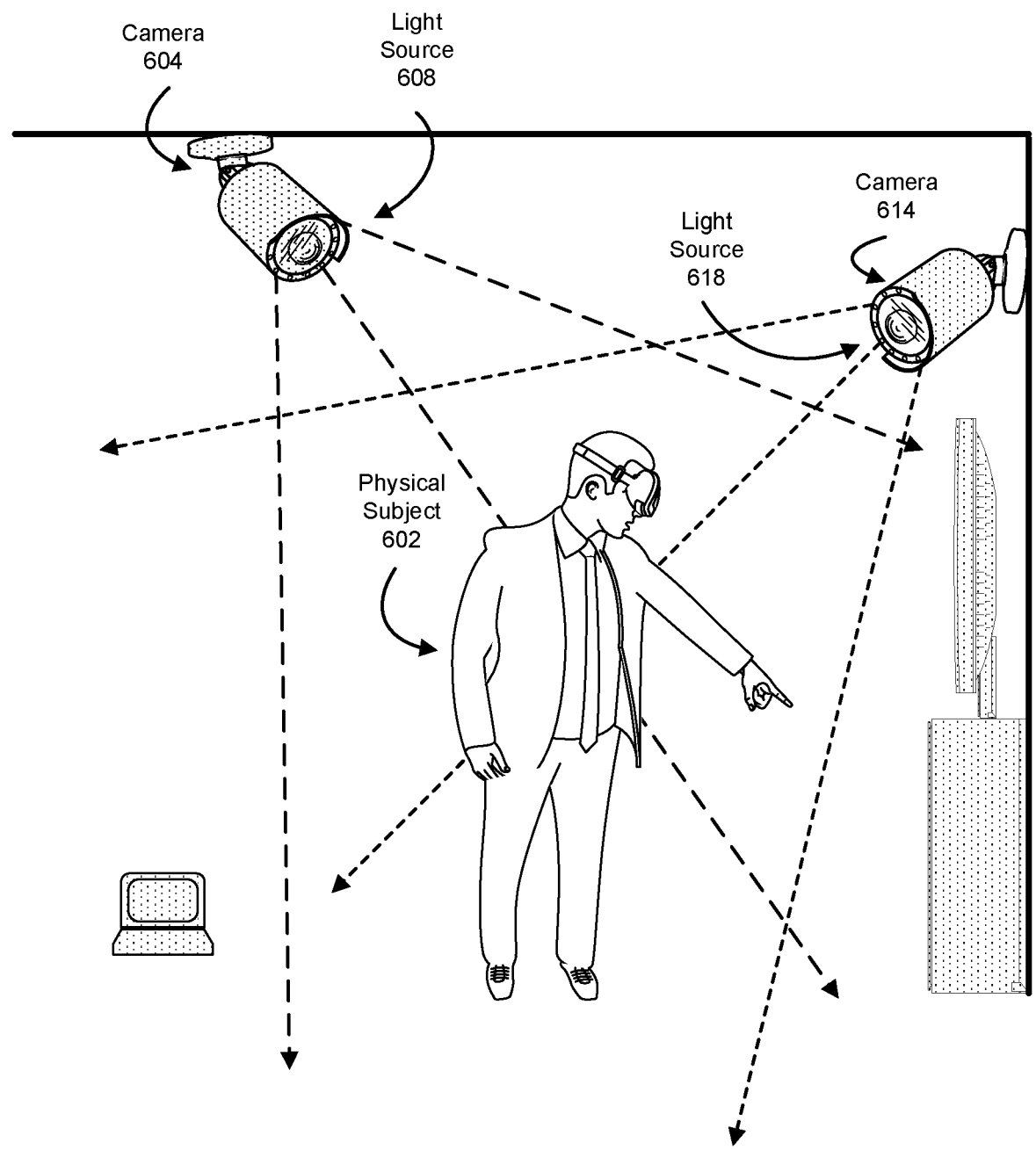
FIG. 6 is an illustration of exemplary system for lighting subjects for artificial reality scenes that includes multiple light sources.

In some embodiments, the systems described herein may configure multiple physical light sources. In some examples, each light source may be coupled to a camera. For example, as illustrated in FIG. 6, a light source 608 may be coupled to a camera 604 and/or a light source 618 may be coupled to a camera 614. In one example, light source 608 and/or light source 618 may light a physical subject 602.

In some examples, the systems described herein may detect that a camera capturing the physical subject does not have sufficient light to optimally capture the subject and may determine the lighting parameter(s) to provide sufficient light to the camera. The term "sufficient light" may generally refer to lighting conditions that enable a camera to capture a subject. In some embodiments, sufficient light may enable a camera to capture a subject with an optimal level of visibility. For example, under certain lighting conditions it may be too dark for a camera to capture high-definition (as opposed to, e.g., grainy) footage of the subject. In one example, the systems described herein may determine that camera 604 does not have sufficient light to optimally capture physical subject 602. In one embodiment, the systems described herein may determine lighting parameters that configure light source 608 and/or light source 618 to produce light of greater intensity so that camera 604 can optimally capture physical subject 602. In some embodiments, providing adequate and/or optimal light for physical subject 602 may enable camera 604 to capture additional information about subject 602, such as depth and/or distance information (e.g., the distance between camera 604 and subject 602).

As described above, the systems and methods described herein may improve an AR experience for a subject and/or viewers by configuring physical light sources to light the physical subject to blend visually with the lighting conditions of an AR scene. This may enable the systems described herein to efficiently generate an avatar of the subject that is appropriately lit for the scene, avoiding the computationally intensive and potentially ineffective process of digitally retouching the avatar in an attempt to blend visually with the lighting conditions of the AR scene. The systems described herein may improve user immersion in AR scenes in a variety of scenarios for users interacting with AR via various different types of AR system.

AR systems may be implemented in a variety of different form factors and configurations. Some AR systems may be designed to work without near-eye displays (NEDs). Other AR systems may include an NED that also provides visibility into the real world (such as, e.g., augmented-reality system 700 in FIG. 7) or that visually immerses a user in an AR (such as, e.g., virtual-reality system 800 in FIG. 8). While some AR devices may be self-contained systems, other AR devices may communicate and/or coordinate with external devices to provide an AR experience to a user. Examples of such external devices include handheld controllers, mobile devices, desktop computers, devices worn by a user, devices worn by one or more other users, and/or any other suitable external system.

Figure 7:
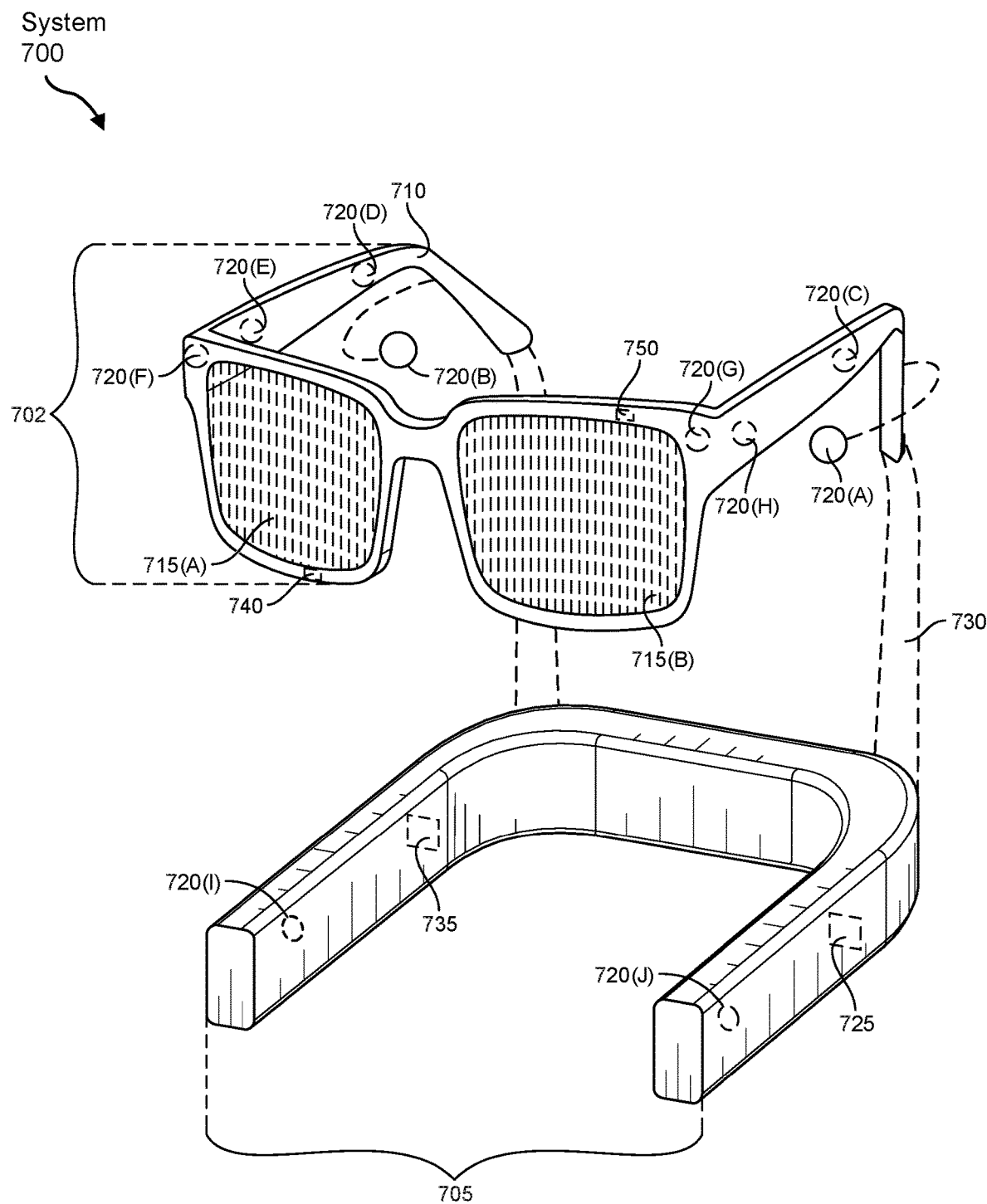
FIG. 7 is an illustration of exemplary augmented-reality glasses that may be used in connection with embodiments of this disclosure.
Figure 8:
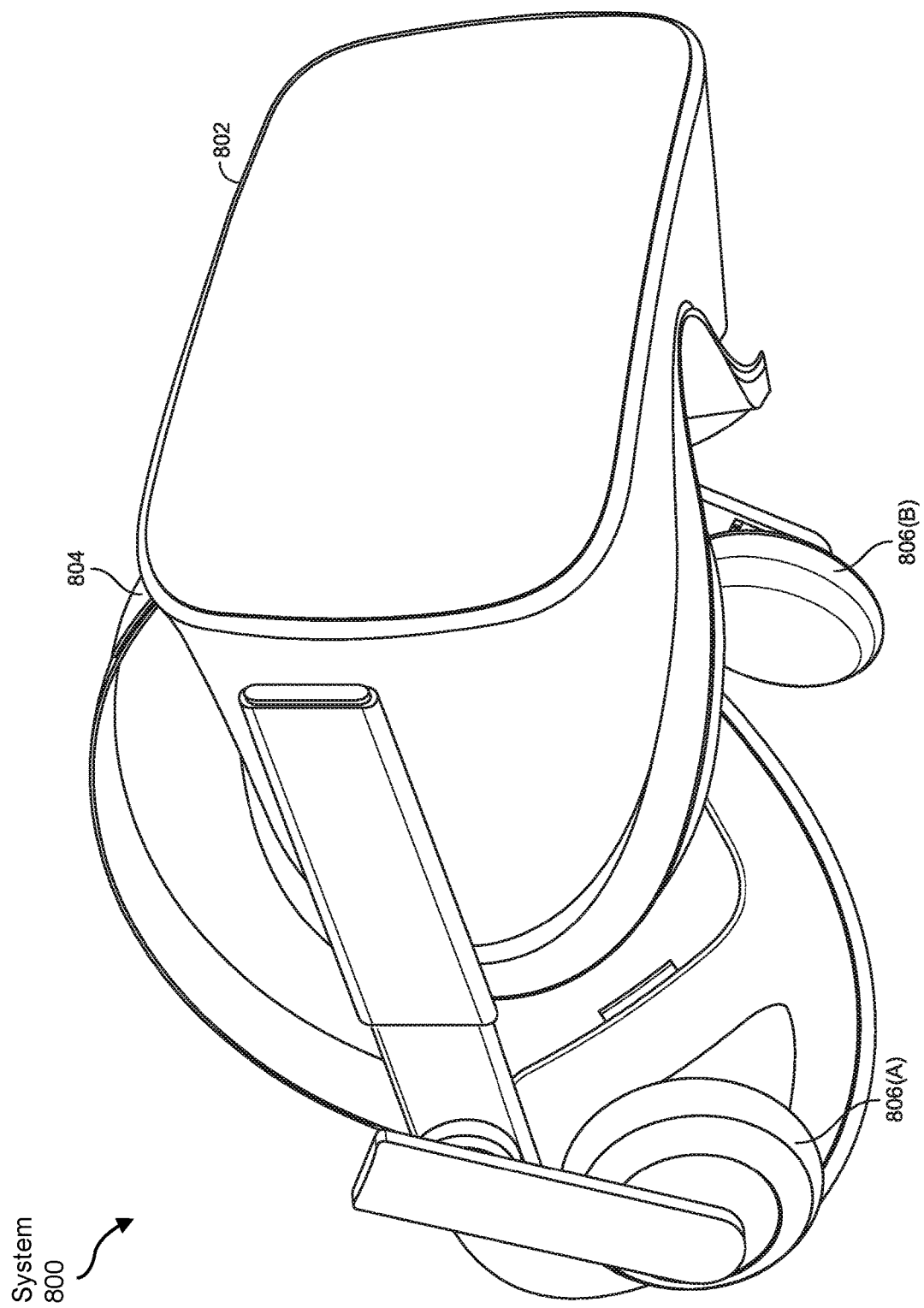
FIG. 8 is an illustration of an exemplary virtual-reality headset that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-120(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(I) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate AR environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some AR systems may, instead of blending an AR with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUS), one or more tracking emitters or detectors, and/or any other suitable device or system for creating an AR experience.

AR systems may include a variety of types of visual feedback mechanisms. For example, display devices in augmented-reality system 700 and/or virtual-reality system 800 may include one or more liquid crystal displays (LCDs), LED displays, microLED displays, organic LED (OLED) displays, digital light project (DLP) micro-displays, liquid crystal on silicon (LCoS) micro-displays, and/or any other suitable type of display screen. These AR systems may include a single display screen for both eyes or may provide a display screen for each eye, which may allow for additional flexibility for varifocal adjustments or for correcting a user's refractive error. Some of these AR systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the AR systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both AR content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. AR systems may also be configured with any other suitable type or form of image projection system, such as retinal projectors used in virtual retina displays.

The AR systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An AR system may process data from one or more of these sensors to identify a location of a user, to map the real world, to provide a user with context about real-world surroundings, and/or to perform a variety of other functions.

The AR systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the AR systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other AR devices, within other AR devices, and/or in conjunction with other AR devices.

By providing haptic sensations, audible content, and/or visual content, AR systems may create an entire virtual experience or enhance a user's real-world experience in a variety of contexts and environments. For instance, AR systems may assist or extend a user's perception, memory, or cognition within a particular environment. Some systems may enhance a user's interactions with other people in the real world or may enable more immersive interactions with other people in a virtual world. AR systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's AR experience in one or more of these contexts and environments and/or in other contexts and environments.

EXAMPLE EMBODIMENTS

Example 1: A method for lighting subjects for AR scenes may include (i) identifying (a) a physical camera configured to capture a physical subject for insertion into an AR scene, (b) a physical light source that is positioned such that the physical light source lights the physical subject recorded by the physical camera, and (c) lighting conditions in the AR scene, (ii) determining at least one lighting parameter to light the physical subject such that lighting conditions of the physical subject blend visually with the lighting conditions in the AR scene, and (iii) configuring the physical light source to light the physical subject according to the at least one lighting parameter.

Example 2: The computer-implemented method of example 1, where the physical light source is affixed to the physical camera.

Example 3: The computer-implemented method of examples 1-2, where the physical light source is a non-removable part of a housing that includes the physical camera.

Example 4: The computer-implemented method of examples 1-3, where the physical light source is a removable attachment configured to be affixed to a housing that includes the physical camera.

Example 5: The computer-implemented method of examples 1-4, where configuring the physical light source to light the physical subject includes configuring multiple physical light sources that each light the physical subject according to the at least one lighting parameter.

Example 6: The computer-implemented method of examples 1-5, where determining the at least one lighting parameter includes determining a separate instance of the at least one lighting parameter for each of the multiple physical light sources.

Example 7: The computer-implemented method of examples 1-6 may further include detecting that the lighting conditions of the AR scene are changing to new lighting conditions, determining at least one new lighting parameter to light the physical subject such that the lighting conditions of the physical subject match the new lighting conditions, and configuring the physical light source to light the physical subject according to the at least one new lighting parameter.

Example 8: The computer-implemented method of examples 1-7, where determining the at least one lighting parameter is based at least in part on detecting that a camera capturing the physical subject does not have sufficient light to optimally capture the subject and determining the at least one lighting parameter to provide sufficient light to the camera.

Example 9: The computer-implemented method of examples 1-8 may further include inserting a three-dimensional model of the physical subject into the AR scene in real time.

Example 10: The computer-implemented method of examples 1-9 may further include streaming a video of a three-dimensional model of the physical subject in the AR scene to at least one endpoint device operated by a user who is not the physical subject.

Example 11: The computer-implemented method of examples 1-10, where the AR scene includes a setting for an AR game.

Example 12: The computer-implemented method of examples 1-11, where the at least one lighting parameter includes at least one of an intensity of light or a color of light.

Example 13: A system for lighting subjects for AR scenes may include (i) a physical camera configured to capture a physical subject for insertion into an AR scene, (ii) a physical light source that is positioned such that the physical light source lights the physical subject recorded by the physical camera, and (iii) a light correlation module that configures the physical light source to light the physical subject such that lighting conditions of the physical subject match lighting conditions in the AR scene by (a) identifying the lighting conditions in the AR scene, (b) determining at least one lighting parameter to light the physical subject such that the lighting conditions of the physical subject blend visually with the lighting conditions in the AR scene, and (c) configuring the physical light source to light the physical subject according to the at least one lighting parameter.

Example 14: The system of example 13, where the physical light source is affixed to the physical camera.

Example 15: The system of examples 13-14, where the physical light source is a non-removable part of a housing that includes the physical camera.

Example 16: The system of examples 13-15, where the physical light source is a removable attachment configured to be affixed to a housing that includes the physical camera.

Example 17: The system of examples 13-16, where the light correlation module (i) detects that the lighting conditions of the AR scene are changing to new lighting conditions, (ii) determines at least one new lighting parameter to light the physical subject such that the lighting conditions of the physical subject match the new lighting conditions, and (iii) configures the physical light source to light the physical subject according to the at least one new lighting parameter.

Example 18: The system of examples 13-17, where the light correlation module determines the at least one lighting parameter based at least in part on detecting that a camera capturing the physical subject does not have sufficient light to optimally capture the subject and determining the at least one lighting parameter to provide sufficient light to the camera.

Example 19: The system of examples 13-18 may further include an AR module that inserts a three-dimensional model of the physical subject into the AR scene in real time.

Example 20: A system for lighting subjects for AR scenes may include at least one physical processor and physical memory including computer-executable instructions that, when executed by the physical processor, cause the physical processor to (i) identify (a) a physical camera configured to capture a physical subject for insertion into an AR scene, (b) a physical light source that is positioned such that the physical light source lights the physical subject recorded by the physical camera, and (c) lighting conditions in the AR scene, (ii) determine at least one lighting parameter to light the physical subject such that lighting conditions of the physical subject blend visually with the lighting conditions in the AR scene, and (iii) configure the physical light source to light the physical subject according to the at least one lighting parameter.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying:
a physical camera configured to capture an image of a physical subject for insertion into an artificial reality scene;
a physical light source that is positioned to light the physical subject being recorded by the physical camera; and
lighting conditions in the artificial reality scene;
determining:
a location within the artificial reality scene of a virtual object that corresponds to the physical subject and uses the image of the physical subject as at least part of an appearance of the virtual object; and
a lighting condition at the location within the artificial reality scene; and
configuring the physical light source to light the physical subject such that lighting conditions of the physical subject cause the image of the physical subject to blend visually with the lighting condition of the location within in the artificial reality scene.

2. The computer-implemented method of claim 1, further comprising determining at least one lighting parameter to light the physical subject such that lighting conditions of the physical subject blend visually with the lighting conditions in the artificial reality scene, wherein configuring the physical light source comprises configuring the physical light source according to the at least one lighting parameter.

3. The computer-implemented method of claim 2, wherein the lighting parameter comprises at least one of:
a color of light;
an intensity of light;
a polarity of light;
a direction of light; and
a location of at least one virtual light source within the artificial reality scene.

4. The computer implemented method of claim 2, wherein the lighting parameter is determined based at least in part on an ambient lighting condition of a physical space occupied by the physical subject.

5. The computer-implemented method of claim 1, wherein the physical light source is affixed to the physical camera.

6. The computer-implemented method of claim 1, wherein the physical light source is mounted on a movable assembly.

7. The computer-implemented method of claim 6, further comprising repositioning, by the movable assembly, the physical light source, to a lighting position that corresponds to a relative position of at least one virtual light source relative to the location of the virtual object.

8. The computer-implemented method of claim 1, further comprising inserting a three-dimensional model of the physical subject into the artificial reality scene in real time.

9. The computer-implemented method of claim 1, further comprising streaming a video of a three-dimensional model of the physical subject in the artificial reality scene to at least one endpoint device operated by a user who is not the physical subject.

10. The computer-implemented method of claim 1, further comprising:
determining that lighting conditions at the location within the artificial reality scene have changed to a new lighting condition; and
configuring the physical light source to light the physical subject such that lighting conditions of the physical subject cause the image of the physical subject to blend visually with the new lighting condition of the location within in the artificial reality scene.

11. The computer-implemented method of claim 1, further comprising:
determining that the location within the artificial reality scene of the virtual object has changed to a new location; and
configuring the physical light source to light the physical subject such that lighting conditions of the physical subject cause the image of the physical subject to blend visually with lighting conditions of the new location.

12. The computer-implemented method of claim 1, wherein configuring the physical light source to light the physical subject comprises configuring multiple physical light sources that each light the physical subject such that lighting conditions of the physical subject blend visually with the lighting conditions in the artificial reality scene.

13. The computer-implemented method of claim 12, further comprising determining, for each of the multiple physical light sources, a separate instance of at least one lighting parameter to light the physical subject such that lighting conditions of the physical subject blend visually with the lighting conditions in the artificial reality scene; and
wherein configuring the multiple physical light sources comprises configuring the multiple physical light sources according to the at least one lighting parameter.

14. A system comprising:
a physical camera configured to capture an image of a physical subject for insertion into an artificial reality scene;
a physical light source that is positioned to light the physical subject being recorded by the physical camera; and
a light correlation module that configures the physical light source to light the physical subject such that lighting conditions of the physical subject match lighting conditions in the artificial reality scene by:
identifying lighting conditions in the artificial reality scene;
determining a location within the artificial reality scene of a virtual object that corresponds to the physical subject and uses the image of the physical subject as at least part of an appearance of the virtual object;
determining a lighting condition at the location within the artificial reality scene; and
configuring the physical light source to light the physical subject such that lighting conditions of the physical subject cause the image of the physical subject to blend visually with the lighting condition of the location within in the artificial reality scene.

15. The system of claim 14, wherein the light correlation module determines at least one lighting parameter to light the physical subject such that lighting conditions of the physical subject blend visually with the lighting conditions in the artificial reality scene, and wherein configuring the physical light source comprises configuring the physical light source according to the at least one lighting parameter.

16. The system of claim 15, wherein the lighting parameter comprises at least one of:
a color of light;
an intensity of light;
a polarity of light;
a direction of light; and
a location of at least one virtual light source within the artificial reality scene.

17. The system of claim 15, wherein the lighting parameter is determined based at least in part on an ambient lighting condition of a physical space occupied by the physical subject.

18. The system of claim 14, wherein the physical light source is affixed to the physical camera.

19. The system of claim 14, wherein the physical light source is mounted on a movable assembly.

20. A system comprising:
- at least one physical processor;
- physical memory comprising computer-executable instructions that, when executed by the at least one physical processor, case the at least one physical processor to:
  - identify:
    - a physical camera configured to capture an image of a physical subject for insertion into an artificial reality scene;
    - a physical light source that is positioned to light the physical subject being recorded by the physical camera; and
    - lighting conditions in the artificial reality scene;
  - determine:
    - a location within the artificial reality scene of a virtual object that corresponds to the physical subject and uses the image of the physical subject as at least part of an appearance of the virtual object; and
    - a lighting condition at the location within the artificial reality scene; and
  - configure the physical light source to light the physical subject such that lighting conditions of the physical subject cause the image of the physical subject to blend visually with the lighting condition of the location within in the artificial reality scene.

* * * * *